United States Patent
Schnitzer et al.

(10) Patent No.: US 9,558,578 B1
(45) Date of Patent: Jan. 31, 2017

(54) ANIMATION ENVIRONMENT

(71) Applicant: Lucasfilm Entertainment Company Ltd., San Francisco, CA (US)

(72) Inventors: Adam Schnitzer, Petaluma, CA (US); Max S-Han Chen, San Mateo, CA (US); Domenico Porcino, San Rafael, CA (US); Louise Rasmussen, Fairfax, CA (US); Greg James, Redwood City, CA (US); Jonathan Stone, San Francisco, CA (US); Steve Sullivan, Mill Valley, CA (US); Kent Oberheu, Berkeley, CA (US)

(73) Assignee: LUCASFILM ENTERTAINMENT COMPANY LTD., San Francisco, CA (US)

( * ) Notice: Subject to any disclaimer, the term of this patent is extended or adjusted under 35 U.S.C. 154(b) by 231 days.

(21) Appl. No.: 13/830,439

(22) Filed: Mar. 14, 2013

Related U.S. Application Data

(60) Provisional application No. 61/746,153, filed on Dec. 27, 2012.

(51) Int. Cl.
*G09G 5/00* (2006.01)
*G06T 13/20* (2011.01)

(52) U.S. Cl.
CPC .................................... *G06T 13/20* (2013.01)

(58) Field of Classification Search
None
See application file for complete search history.

(56) References Cited

U.S. PATENT DOCUMENTS

| | | | |
|---|---|---|---|
| 6,091,427 A | 7/2000 | Boezeman et al. |
| 6,144,385 A | 11/2000 | Girard |
| 6,714,201 B1 | 3/2004 | Grinstein et al. |
| 6,972,765 B1 | 12/2005 | Duplat |
| 7,324,121 B2 | 1/2008 | Young |

(Continued)

FOREIGN PATENT DOCUMENTS

| | | |
|---|---|---|
| EP | 1918880 A2 | 5/2008 |
| WO | 2010/051493 A2 | 5/2010 |
| WO | 2012/177991 A1 | 12/2012 |

OTHER PUBLICATIONS

Autodesk, Inc. "Autodesk Maya 2010: Getting Started with Maya," 2009, downloaded from the internet at: http://images.autodesk.com/adsk/files/gettingstaredmaya2010.pdf on Jun. 29, 2011, Cover page, Table of Contents, Chapter 6, 135 pages.

(Continued)

*Primary Examiner* — Xiao Wu
*Assistant Examiner* — Mohammad H Akhavannik
(74) *Attorney, Agent, or Firm* — Kilpatrick Townsend & Stockton LLP

(57) ABSTRACT

Methods, systems, and apparatus, including computer programs encoded on computer storage media, for animation. An animation application creates an animation environment. An input device receives input from a user to the animation application. An output device displays output to the user of the animation application. The animation application is configured to have a mode of operation that includes displaying, through the output device, a 3D animation view of the animation environment overlain by a 2D edit view of the animation environment.

20 Claims, 17 Drawing Sheets

(56) References Cited

U.S. PATENT DOCUMENTS

| | | | |
|---|---|---|---|
| 7,965,294 | B1 | 6/2011 | Milliron |
| 8,606,678 | B2 | 12/2013 | Jackowitz et al. |
| 8,701,008 | B2 | 4/2014 | Keng et al. |
| 2004/0027352 | A1 | 2/2004 | Minakuchi |
| 2004/0100482 | A1 | 5/2004 | Cajolet et al. |
| 2005/0156932 | A1 | 7/2005 | Vienneau et al. |
| 2007/0262996 | A1 | 11/2007 | Fernandez et al. |
| 2008/0180438 | A1* | 7/2008 | Sasaki ............... A63F 13/10 345/420 |
| 2009/0046097 | A1 | 2/2009 | Franklin |
| 2010/0085351 | A1 | 4/2010 | Deb et al. |
| 2010/0156911 | A1 | 6/2010 | Zhao et al. |
| 2010/0207950 | A1 | 8/2010 | Zhao et al. |
| 2010/0214313 | A1 | 8/2010 | Herman et al. |
| 2012/0021828 | A1* | 1/2012 | Raitt et al. ............... 463/31 |
| 2012/0229475 | A1* | 9/2012 | Sheridan ............ G06T 13/40 345/474 |
| 2012/0327088 | A1 | 12/2012 | Schnitzer et al. |
| 2013/0141427 | A1 | 6/2013 | Lucas et al. |
| 2014/0250392 | A1 | 9/2014 | Riggins et al. |

OTHER PUBLICATIONS

Giambrune, Mark: "3D Graphics & Animation, 2$^{nd}$ Edition," 2002, New Riders Publishing, USA, XP002695294, pp. 368-380, pp. 372, 373, 376.

Microsoft, "APP HUB Community Forums: Exporting Animation Step Keys," Oct. 21, 2008, downloaded from the internet at: http://forums.create.msdn.com/forums/t/18976.aspx on Jun. 28, 2011, 1 page.

PL Studios, Inc. "Digital Tutors: Community Forums: Thread: Character Animation Problem: Phantom Step Key Pops Leg Up??" Jun. 17, 2009, downloaded from the internet at: http://www.digitaltutors.com/forum/showthread/php?18630-Character-Animation-problem-Phantom-step-key-pops-leg-up on Jun. 28, 2011, 2 pages.

Silicon Graphics, Inc. "IRIX 6.5 Product Release Notes/Information," downloaded from the internet at http://techpubs.sgi.com/library/tpl/cgi-bin/getdoc.cgi?coll=0650&db=relnotes&fname=/usr/relnotes/cosmoworlds on Apr. 2, 2012, 33 pages.

The University of Queensland, "VisLab: Creating and Animating a Rocket," Jan. 18, 2001, downloaded from the internet at: http://www.vislab.uq.edu.au/users/manuals/cosmoworlds/Tutorial/rocket_intro.html on Apr. 2, 2012, 18 pages.

Wikipedia, "Animation" May 28, 2010, downloaded from the internet at: http://web.archive.org/web/20100528081917/http:/en.wikipedia.org/wiki/Animation on Jun. 28, 2011, 10 pages.

Wikipedia, "Bezier Curve," May 30, 2010, downloaded from the internet at: http://web.archive.org/web/20100530233921/http:/en.wikipedia.org/wiki/B%C3%A9zier_curve on Jun. 28, 2011, 10 pages.

Wikipedia, "Computer Animation," Apr. 30, 2010, downloaded from the internet at: http://web.archive.org/web/20100430162149/http:/en.wikipedia.org/wiki/Computer_animation on Jun. 28, 2011, 7 pages.

Wikipedia, "Spline (mathematics)", Oct. 14, 2009, downloaded from the internet at: http://web.archive.org/web/20091014015215/http:/en.wikipedia.org/wiki/Spline_(mathematics) on Jun. 28, 2011, 8 pages.

International Preliminary Report on Patentability issued May 20, 2014 for PCT/US2012/065518, 12 pages.

International Search Report and Written Opinion for PCT/US2012/065518 mailed Apr. 26, 2013, 14 pages.

International Preliminary Report on Patentability issued Dec. 24, 2013 for PCT/US2012/043722, 5 pages.

International Search Report and Written Opinion for PCT/US2012/043722 mailed Oct. 23, 2012, 8 pages.

U.S. Appl. No. 13/168,189, filed Jun. 24, 2011, first named inventor: Adam Schnitzer.

U.S. Appl. No. 13/168,189, filed Jun. 24, 2011, Non Final Rejection mailed Oct. 7, 2013, all pages.

U.S. Appl. No. 13/168,189, filed Jun. 24, 2011, Final Rejection mailed Mar. 24, 2014, all pages.

U.S. Appl. No. 13/168,189, filed Jun. 24, 2011, Non Final Rejection mailed Jul. 2, 2014, all pages.

U.S. Appl. No. 13/168,189, filed Jun. 24, 2011, Notice of Allowance mailed Jan. 15, 2015, all pages.

U.S. Appl. No. 13/679,046, filed Nov. 16, 2012 Non Final Rejection mailed Jun. 12, 2014, all pages.

U.S. Appl. No. 13/679,046, filed Nov. 16, 2012 Final Rejection mailed Dec. 19, 2014, all pages.

* cited by examiner

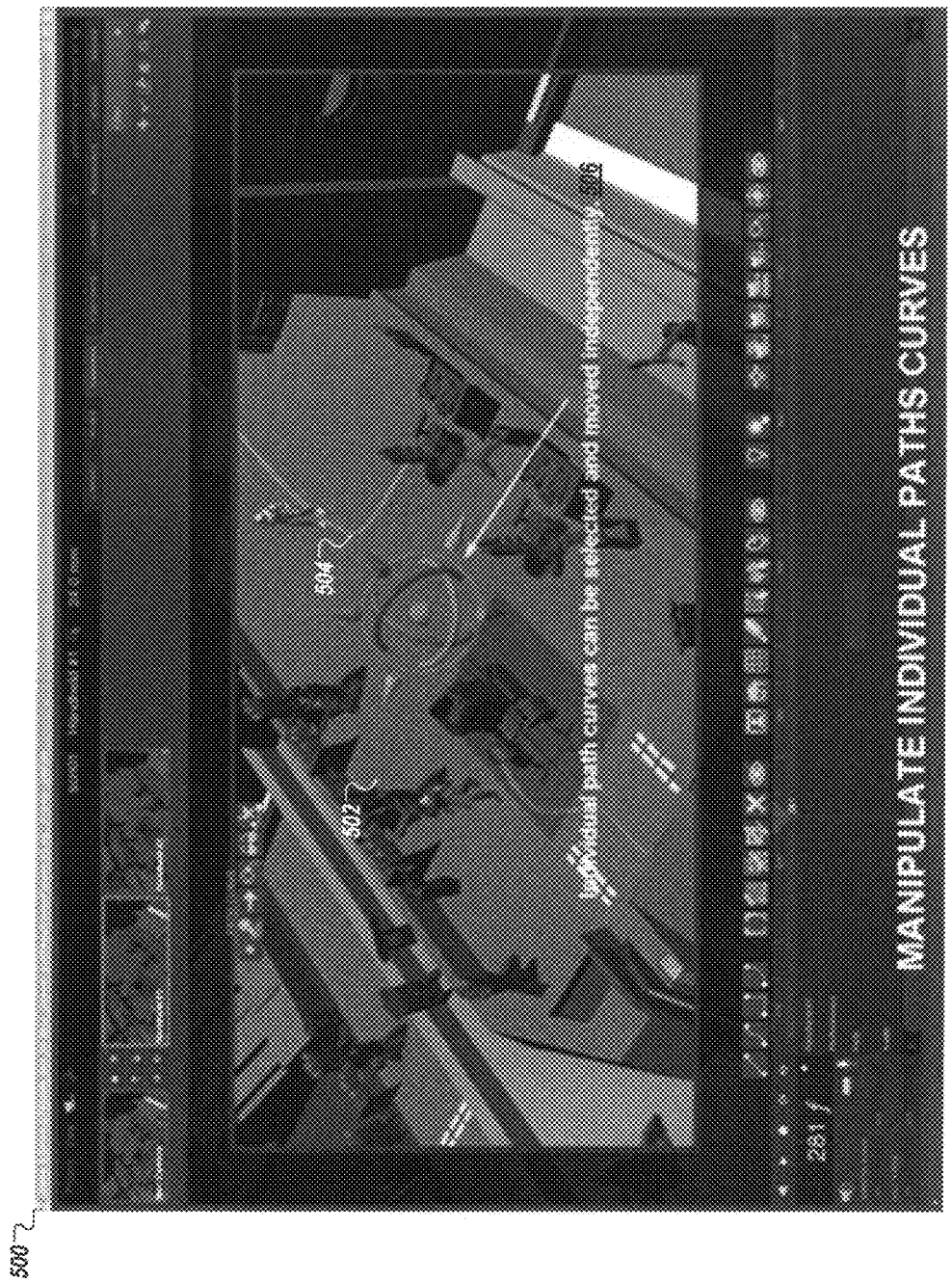

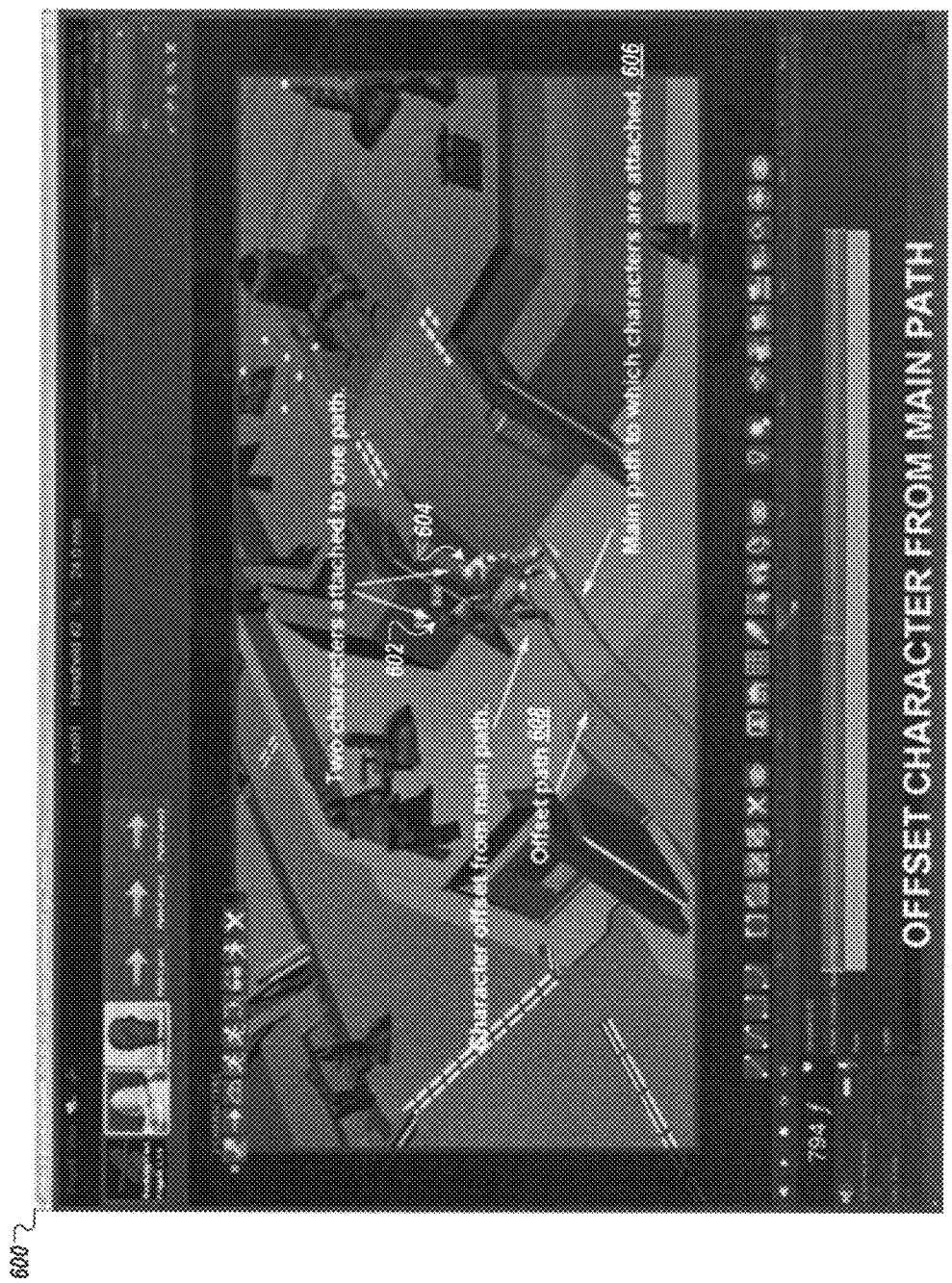

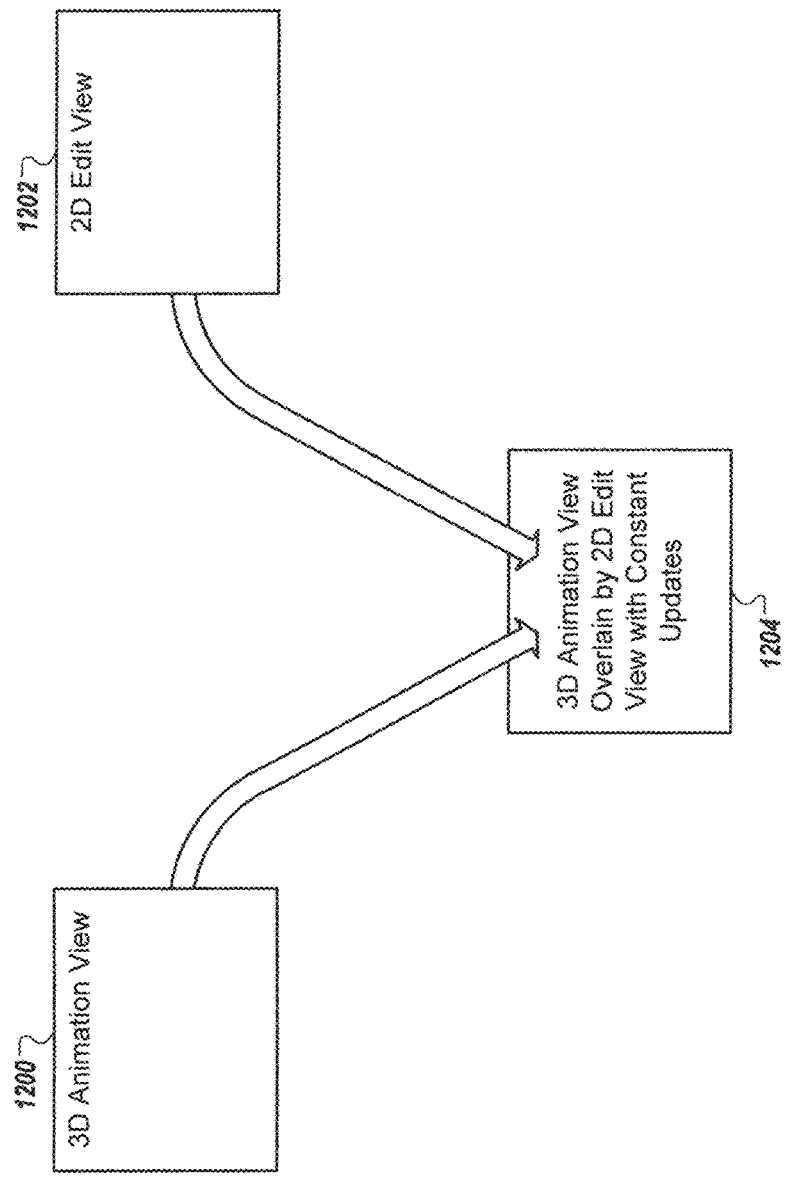

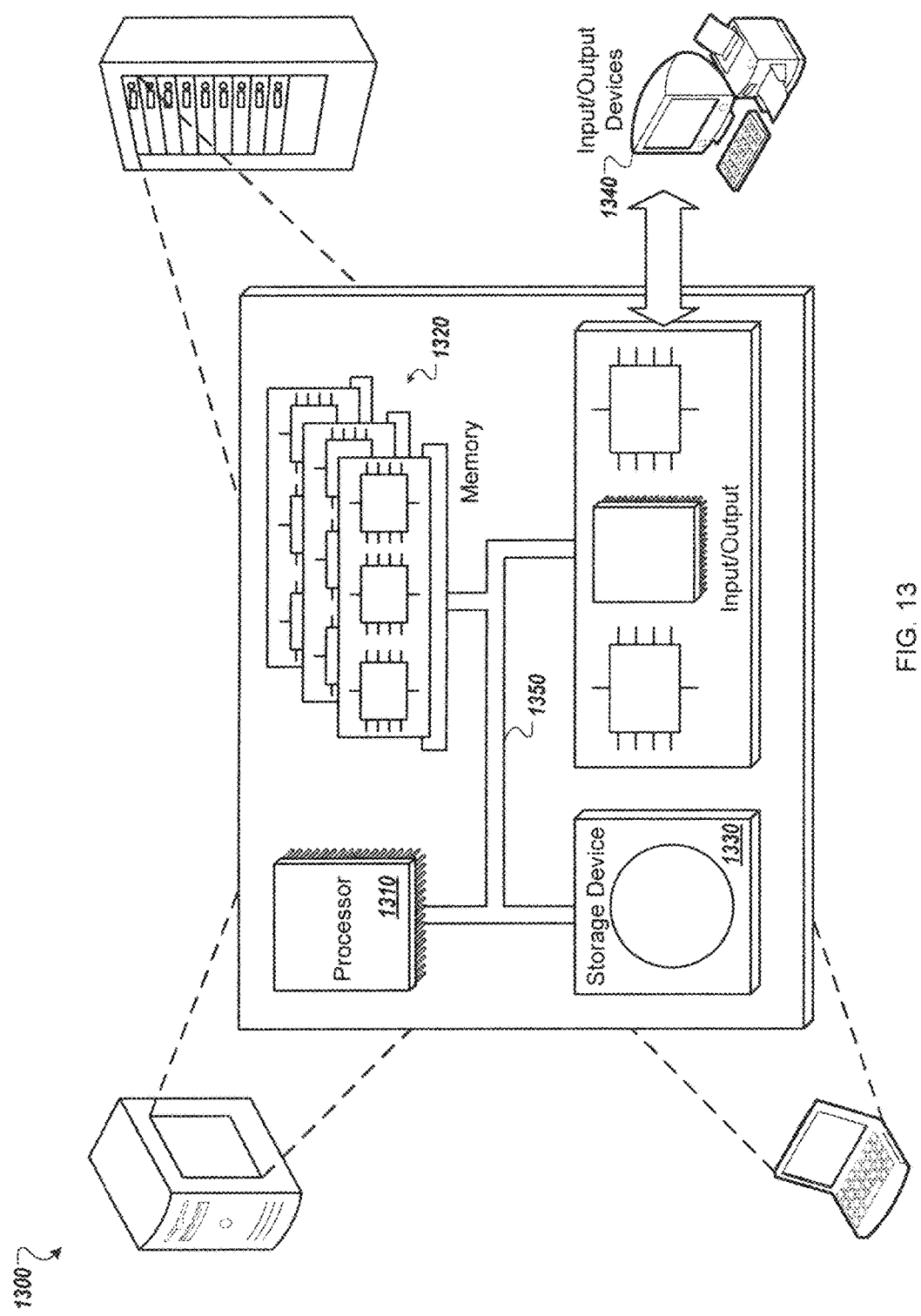

ANIMATION ENVIRONMENT

CROSS-REFERENCE TO RELATED APPLICATIONS

This application claims priority to U.S. Application Ser. No. 61/746,153, filed on Dec. 27, 2012, entitled "Animation Environment", the entire contents of which is hereby incorporated by reference.

BACKGROUND

This instant specification relates to computer animation.

Artists and film-makers use three-dimensional "3D" computer graphics software to create 3D computer-generated images and animations. Animators typically use multiple computer programs, including 3D editors and non-linear editors to create 3D images and animations. 3D editors (including 3D modeling, animation, layout, and rendering programs, and the like) allow a user to create and manipulate 3D models, e.g., mathematical representations of 3D objects. The user can combine 3D models to create a 3D scene 101 (FIG. 1). The 3D scene 101 includes an environment, cameras 103, lighting, and props 107. The environment is the setting of a scene, for example, an office, a house, or a park. The cameras 103 are virtual cameras, e.g., computer simulated cameras that define a perspective or point-of-view to render a 3D scene from. The props 107 are 3D models of objects that are in the scene for a particular shot, for example, people and cars. Some 3D editors allow a user to create an ordered sequence of rendered two-dimensional "2D" images of a 3D scene, commonly referred to as a clip or a take.

Once a user has created one or more clips, a conventional non-linear editor allows the user to arrange and modify the clips along a timeline. A user can combine multiple clips to create a time-ordered sequence of clips, commonly called a sequence. The editor is non-linear in the sense that it can randomly access frames or clips within the sequence. Non-linear editors can include other tools, for example, tools to apply video effects such as fading in or out.

Some animators begin animation by creating 3D scenes and shooting (rendering from the point-of-view of a virtual camera) multiple clips of those scenes. Then, when the animator is finished manipulating 3D objects and shooting clips, the clips are combined in a non-linear editor to create sequences and ultimately a finished animation. This creation process is familiar to traditional film directors, who shoot scenes in real life with real cameras and then combine the footage in a non-linear editing environment after all of the filming is done.

SUMMARY

In one aspect, a computer system includes one or more processing devices. The system further includes a computer-readable media having instructions that, when executed by the one or more processing devices, generates an animation application having an animation environment. The system further includes an input device for receiving input from a user to the animation application. The system further includes an output device for displaying output to the user of the animation application. The animation application is configured to have a first mode of operation that includes displaying, through the output device, a 3D animation view of the animation environment overlain by a 2D edit view of the animation environment.

Implementations can include any, all, or none of the following features. The first mode of operation further includes receiving input through the input device, which results in i) a change to the animation environment, ii) an update to the 3D animation view of the animation environment that reflects the change to the animation environment, and iii) an update to the 2D edit view of the animation environment that reflects the change to the animation environment. The update to the 3D animation view and the update to the 2D edit view of the animation environment are in real time. The animation environment includes a plurality of assets animated within the animation environment and a virtual camera for rendering the 2D edit view of the animation environment. The animation application is further configured to have a second mode of operation that includes displaying, through the output device, the 3D animation view of the animation environment; and wherein the second mode of operation further includes receiving second input through the input device, which results in i) a change to the animation environment and ii) an update to the 3D animation view of the animation environment that reflects the change to the animation environment. The animation application is further configured to have a third mode of operation that includes displaying, through the output device, the 2D edit view of the animation environment; and wherein the third mode of operation further includes receiving third input through the input device, which results in a change to the 2D view of the animation environment. The animation application is configured to run in the first mode, the second mode, and the third mode on a single workstation.

In one aspect, a method includes displaying, through an output device by an animation application operating in a first mode, a 3D animation view of an animation environment overlain by a 2D edit view of the animation environment. The method further includes receiving input, through an input device to the animation application operating in the first mode, from a user of an animation application.

Implementations can include any, all, or none of the following features. The method includes changing, responsive to receiving the input, the animation environment; updating, responsive to receiving the input, the 3D animation view of the animation environment that reflects the change to the animation environment; and updating, responsive to receiving the input, the 2D edit view of the animation environment to reflect the change to the animation environment. Updating the 3D animation view and updating the 2D edit view is performed in real time. The animation environment includes a plurality of assets animated within the animation environment; and a virtual camera for rendering the 2D edit view of the animation environment. The method including displaying, through the output device by the animation application operating in a second mode, the 3D animation view of the animation environment; receiving second input, through an input device to the animation application operating in the second mode, from a user of an animation application; changing, responsive to receiving the second input, the animation environment; and updating, responsive to receiving the second input, the 3D animation view of the 3D animation view of the animation environment to reflect the change to the animation environment. The method including displaying, through the output device by the animation application operating in a third mode, the 2D edit view of the animation environment; receiving third input, through an input device to the animation application operating in the third mode, from a user of an animation application; and changing, responsive to receiving the third input, the 2D view of the animation environment. The animation application is configured to run in the first mode, the second mode, and the third mode on a single workstation. The animation application is further configured to have a fourth mode of operation that includes displaying, through the output device, a 3D animation view of the animation environment overlain by a 2D edit view of the animation environment overlain by a target video.

In one aspect, a computer-readable medium having stored therein instructions that when executed perform a method includes displaying, through an output device by an animation application operating in a first mode, a 3D animation view of an animation environment overlain by a 2D edit view of the animation environment. The method further includes receiving input, through an input device to the animation application operating in the first mode, from a user of an animation application.

Implementations can include any, all, or none of the following features. The computer-readable medium including changing, responsive to receiving the input, the animation environment; updating, responsive to receiving the input, the 3D animation view of the animation environment that reflects the change to the animation environment; and updating, responsive to receiving the input, the 2D edit view of the animation environment to reflect the change to the animation environment. Updating the 3D animation view and updating the 2D edit view is performed in real time. The computer-readable medium including displaying, through the output device by the animation application operating in a second mode, the 3D animation view of the animation environment; receiving second input, through an input device to the animation application operating in the second mode, from a user of an animation application; changing, responsive to receiving the second input, the animation environment; and updating, responsive to receiving the second input, the 3D animation view of the 3D animation view of the animation environment to reflect the change to the animation environment. The computer-readable medium including displaying, through the output device by the animation application operating in a third mode, the 2D edit view of the animation environment; receiving third input, through an input device to the animation application operating in the third mode, from a user of an animation application; and changing, responsive to receiving the third input, the 2D view of the animation environment. The animation application is configured to run in the first mode, the second mode, and the third mode on a single workstation.

The systems and techniques described here may provide one or more of the following advantages. An animation system that permits an animator to define a character's movements with a combination of keyframes and paths can allow for the creation of complex animations efficiently. An animation system that permits an animator to define a character's movements with a number of path shapes (e.g., splines, non-uniform rational B-splines or NURBS) can allow an animator more flexibility than a system that only supports one type of curve. An animation system that permits an animator to change path shapes into keyframes and keyframes into paths can allow an animator to progressively refine a rough-cut animation.

A virtual camera view-finder window with a control to pin the view-finder or set the view-finder as the main view can allow an animator to use the virtual camera and view-finder efficiently. A virtual camera with controls for local movements, global movements, and a combination of local and global movements can allow the animator to move the virtual camera in ways that are difficult or impossible in a real-world camera control system. An animation system that displays an edit view overlain with an animation view can provide immediate feedback to an animator about edits made to the 3D environment that is being recorded.

The details of one or more implementations are set forth in the accompanying drawings and the description below. Other features and advantages will be apparent from the description and drawings, and from the claims.

BRIEF DESCRIPTION OF THE DRAWINGS

FIG. 5 is an example GUI showing an edit to a path curve.

FIG. 6A is an example GUI showing an offset animation path.

FIG. 12A schematically shows an example GUI showing 3D animation view overlain by a 2D edit view with constant updates.

FIG. 13 is a schematic diagram that shows an example of a computing system.

Like reference symbols in the various drawings indicate like elements.

DETAILED DESCRIPTION

Figure 2:
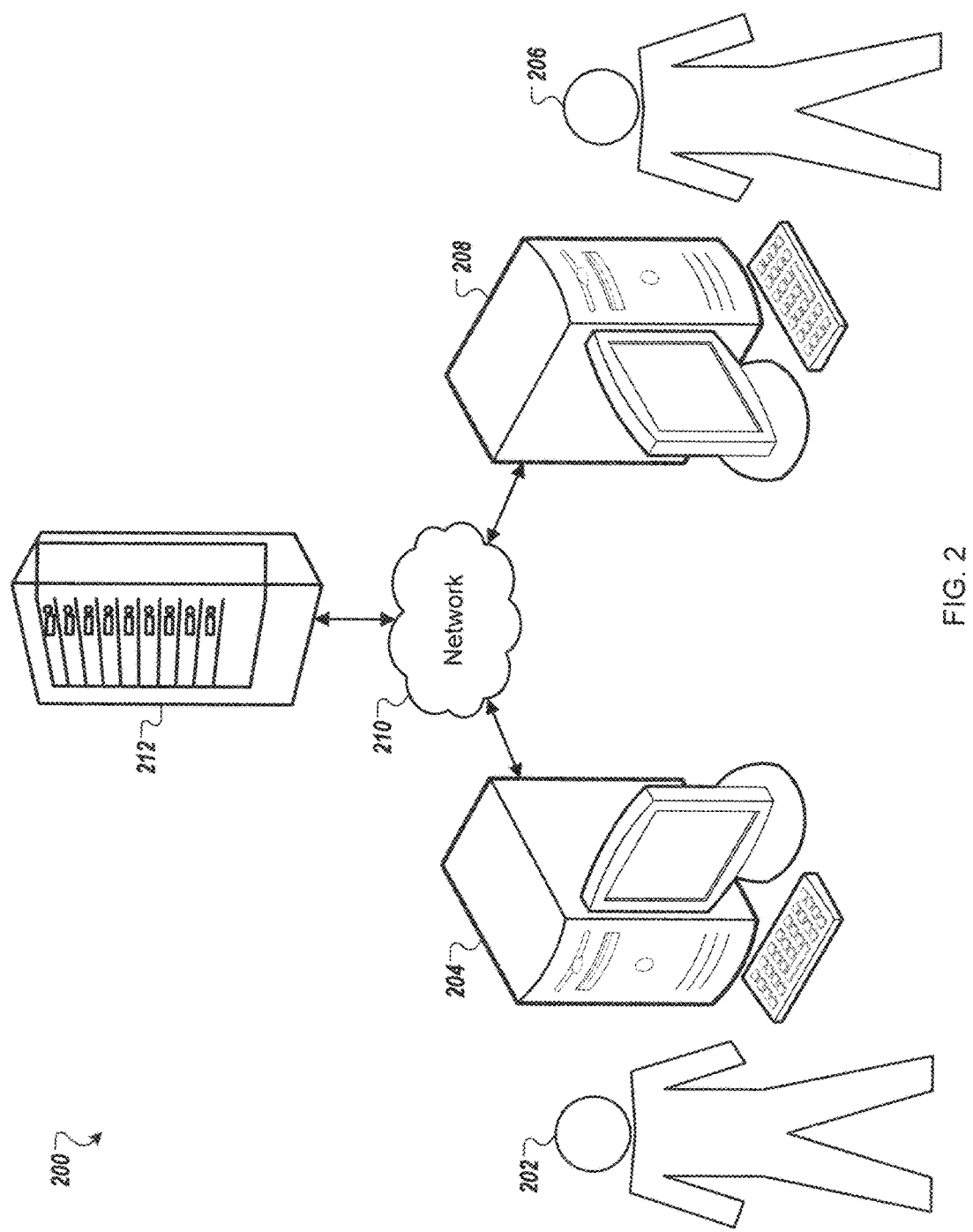
FIG. 2 is a block diagram of an example computer system for animating and editing a video.

A 3D animation system may be used to create animations of models within a virtual environment. The 3D animation system may also be used to create previsualizations of those animations or of a script to be shot with live action. In large scale projects, such as those in use for motion pictures, television shows, and/or video games, the creation of these animations may be complex and time consuming, involving the work of many people over extended periods of time. The availability of tools in the animation system to increase flexibility and ease of animation can have a great impact on the cost, time, and quality of the animation. Described below are a collection of such tools. Any single tool, group of tools, or all tools may be incorporated in an animation system or other appropriate computer system FIG. 2 is a block diagram of an example computer system 200 for animating and editing a video. The computer system 100 may be used, for example, by an animation studio tasked with producing a motion picture according to a script developed by the for animating and editing a video. The following description uses such a motion picture as the basis for an example, but it will be understood that the computer system 200 can be used for many other purposes as well, e.g. animations for other entertainment purposes, physical simulations.

An animator 202 represents one or more users tasked with animating assets, e.g. characters or vehicles, within a virtual environment according to the script. The animator 202 can use an animation workstation 204 to load an animation application that has access to assets and virtual environments for animation. The animation workstation 204 includes a one or more input devices (e.g., mouse, keyboard, or tablet) and one or more output devices (e.g. one or more monitors, speakers) that the animator 202 can use to interact with the animation application, and one or more processing devices, memory, and other computer hardware to run the animation application. Although a computer tower with separate keyboard and monitor are shown here, other physical configurations are possible. For example, some animation workstations 204 may be tablet computing devices, laptops, etc.

The animator 202 can load the assets and virtual environments called for in the script into the animation application. The animator 202 can next create animations for the assets so that the assets move, speak, and interact within the virtual environments. Generally speaking, the animator 202 can interact with the virtual environment and assets from any arbitrary point of view. That is, the animator 202 may be able to move their view portal to any location and orientation within the virtual environment. This may be considered to be analogous to the way a director is able to walk around a physical set to direct the cast of a live shoot.

Once the animator 202 is finished with a portion of the animation for the motion picture, e.g. a first take at a scene, the animation can be rendered from the point of view of one or more virtual cameras in the animation application. This rendering can produce one or more sequences of 2D images or videos, analogous to the way that a physical video camera produces 2D video of a real 3D scene.

An editor 208, using an editing workstation 210, can edit the 2D videos together using, for example, a non-linear editor. This editing may often include switching from one shot to another within a scene, applying spoken performance and sound effects, etc. In some instances, the editing workstation 210 may have the same or similar capabilities as the animation workstation 204. In fact, in some cases, a single software application running instances on both the editing workstations 204 and on the editing work stations 210 may provide for both animation and editing.

The animation workstation 204 and the editing workstation 208 may both communicate, over a network 210 (e.g. a local area network, the internet) with a datastore 212. The datastore 212 may, for example, hold the assets and virtual environments used to create the animations, hold the animation definitions, the 2D renderings, and the final edited video. In some implementations, the datastore 212 also provides archival functionality, access control, redundant backup, and communication features for the animators 202 and the editors 206.

Once completed, the animation workstation 204, the editing workstation 208, or any other appropriate computing device can generate an animation product. For example, a single image, sequence of images, video, or other appropriate data can be generated. This data may be stored in the datastore 212, stored to a computer readable medium, printed to film or paper, or transmitted to another computer system for use or storage.

Many configurations of the computer system 200 are possible. For example, while a single animator 202 and a single editor 206 are shown, a project may use many teams of animators and editors. These animators and editors may be the same people, or may be employees of different companies. The animators and editors may be geographically disparate, including working in different countries. The datastore 212 may have an animation subsystem with limited communications with an editor subsystem. Other configurations are possible.

FIGS. 3-11 show example GUIs that may be displayed, for example, by the animation workstation 204 and/or the editor workstation 206, or by other computer systems. The accompanying descriptions will discuss tools or features of an animation application and how a user, e.g., the animator 202 and/or the editor 206, may use the features. FIGS. 3-6 generally pertain to character animation paths. FIGS. 7-10 generally pertain to virtual camera controls, and FIG. 11 generally pertains to a hybrid animation and editing interface.

Figure 3A:
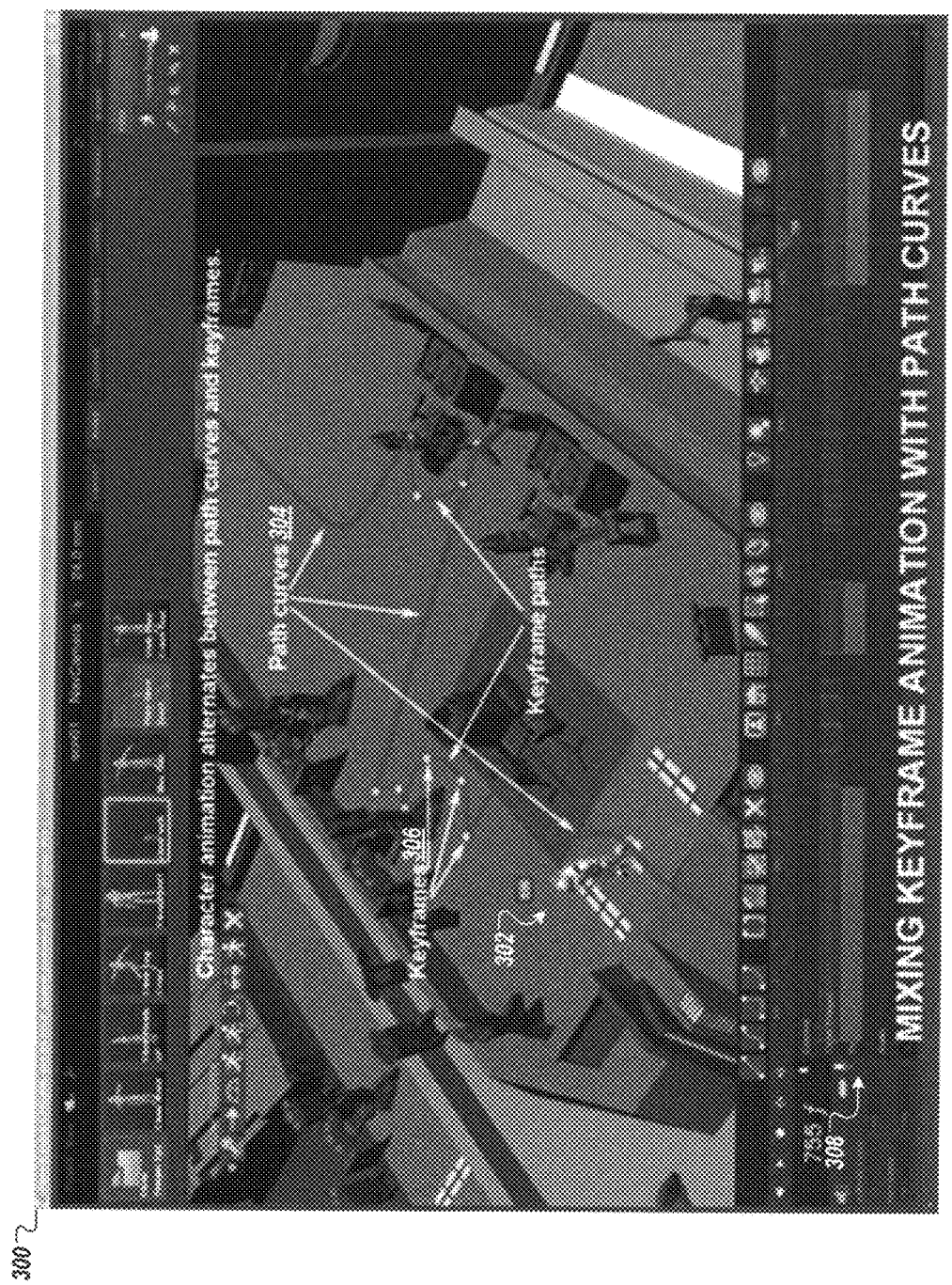
FIG. 3A is an example graphical user interface (GUI) showing path curves and key frames.

FIG. 3A is an example graphical user interface (GUI) 300 showing path curves and key frames. In the GUI 300, a character 302 is animated to walk around a virtual environment populated with props. The character 302 has a single animation path that includes multiple path curves 304 as well as multiple keyframes 306. In general, these path curves 304 and keyframes 306 may be placed in the virtual environment by a user, but automatic generation of the animation path is also possible.

As shown, the character animation is able to move from the path curves 304 to the keyframes 306 and back within what will appear to be a seamless animation. This may allow, for example, path curves 304 to be used in large or open areas and the keyframes 306 to be used when the character is navigating smaller areas.

In addition to moving from path curves 304 to keyframes, the character animation can also move from one type of path curve 304 to another. For example, one path curve 304 may be defined as a straight line, one as a spline, and one as a NURBS, and the character can be animated to traverse a path that contains all of these path curves 304. Additionally, the path curves 304 may be converted from one type of curve to another or into one or more keyframes 306. Similarly, a sequence of keyframes 306 can be converted into any suitable type of path curve 304.

One use case that is possible with this type of animation path involves making a first, rough animation for the character 302 and then to progressively refine the animation. For example, the movie script may call for the character to walk around the virtual environment while speaking out loud. A user may create a first draft of the character's path, and then animate the character to move along the path at a constant (e.g. walking speed). The character's animation is shown in a non-linear editor 308. Based on this display, the user (or a different user) may determine that the character 302 needs to spend more time walking around the virtual environment to have enough time to speak the words called for in the script. In this case, the user may, for example, place some additional keyframes to lengthen the path. Additionally, the user may refine the path by converting path curves 304 to keyframes 306, or vice versa, and adjust the new path curves 304 and keyframes 306.

Figure 3B:
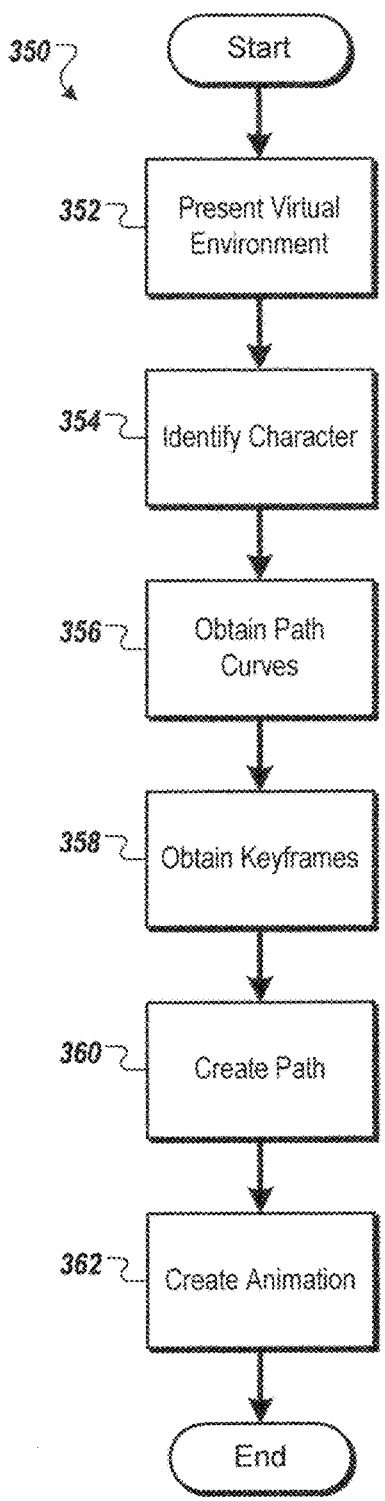
FIG. 3B is a flowchart of an example process for generating an animation path containing path curves and key frames.

FIG. 3B is a flowchart of an example process 350 for generating an animation path containing path curves and key frames. The process 350 can be performed by, for example, systems including one or more computing devices running an animation application. However, another system, or combination of systems, can be used to perform the process.

A virtual environment is presented (352). For example, an animation application can access a virtual environment from a datastore, e.g., in response to a user selection, and populate the virtual environment with props, characters, lighting, cameras, and other assets. The virtual environment and the assets may be presented to a user (e.g., an animator) in a GUI that allows the animator to modify the assets and/or the virtual environment.

A character is identified (354). For example, the user may use an input device select a character in the virtual environment that the user wishes to animate. The character may have, for example, a 3D model rigged so that as the model's rig control values change, the shape of the model changes. Additionally, the character may have associated properties such as a name, walking speed, etc.

Path curves are obtained (356). For example, the user may use an input device to define or select one or more curve shapes and to place the curve shapes in the virtual environment. There are many types of mathematical curve definitions, and any appropriate type may be used. In addition, the animation application can provide the user with a collection of default or pre-created curves, from which the user may select, modify, and place in the virtual environment.

Keyframes are obtained (358). For example, the user can, with an input device, select a spot in the virtual environment, and the animation application can create a keyframe at that location. They user may repeat this selection process, creating a sequence or unordered group of keyframes. In many cases, the order of reception of keyframes (358) and path curves (356) can vary depending on the type of path that the user is creating. It is possible, for example, to receive a keyframe (358), then a path curves (356), then a few keyframes (358), then a few path curves (356) etc.

A path is created (360). For example, the animation application can create a path that includes all of the path curves and keyframes created by the user for a single character. In some cases, the animation application may be configured to generate the path in the order that the keyframes and path curves were created. In some other cases, the animation application may be configured to allow the user to specify the order of keyframes and path curves, including edits to existing keyframes and path curves, in the path. In some other cases, the animation application may order the keyframes and path curves within the path according to an automated analysis of the keyframes, path curves, and virtual environment.

An animation is created (362). For example, the animation application can create an animation for the character in which the character traverses the path at a predefined or user-defined speed. While moving, the character's rig many be manipulated so that the character, for example, goes through the motions of a walking or running animation while traversing the path.

Figure 4A:
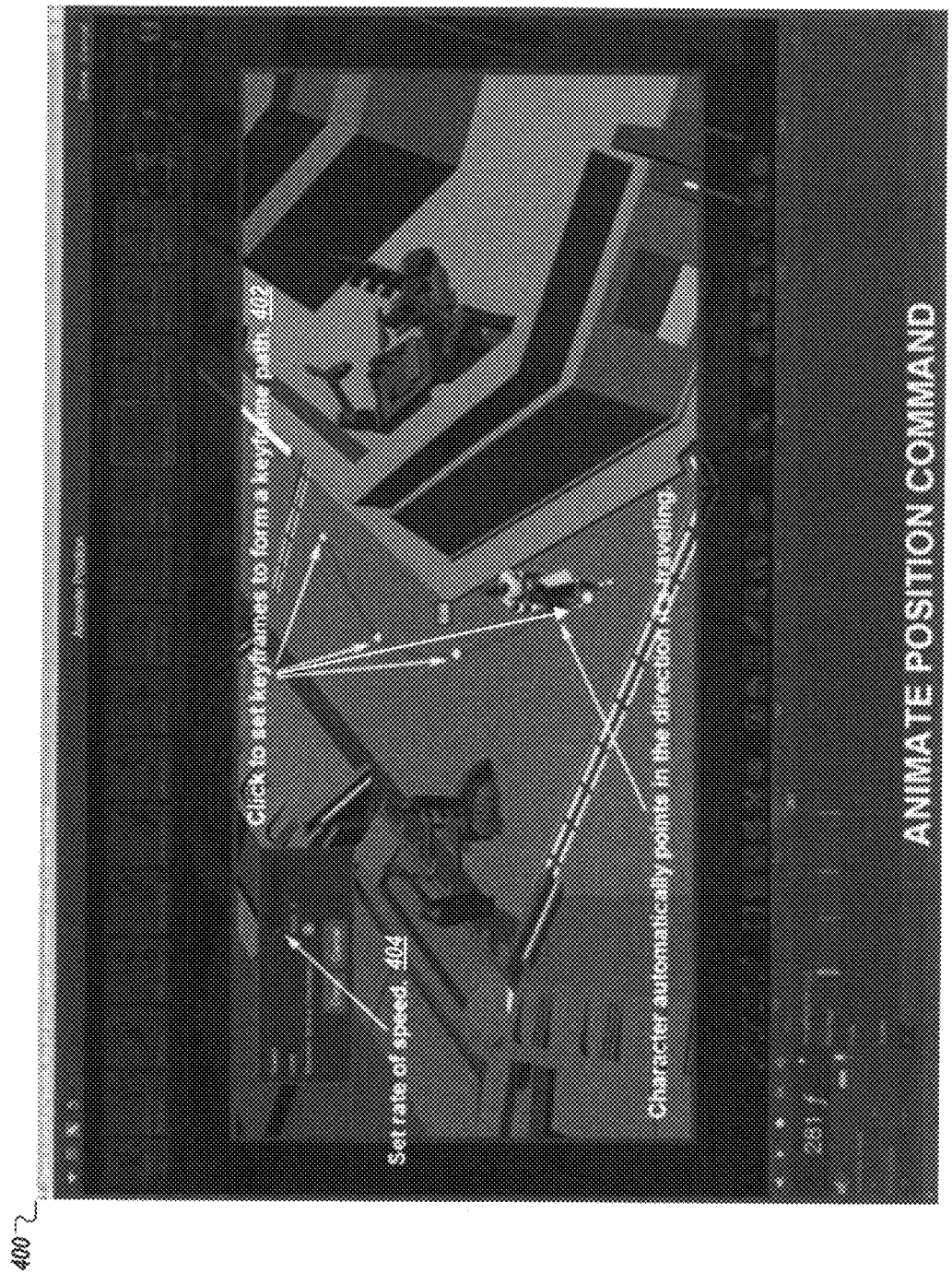
FIG. 4A is an example GUI showing an animation of character position.

FIG. 4A is an example GUI 400 showing an animation of character position. In FIG. 4A, the GUI 400 shows a use of a command sometimes called "Animate Position".

In the GUI 400, a user is presented with a virtual environment through which a character is to move (e.g. walk or run). Using an input device (e.g. a mouse or tablet stylus) the user select four points 402 on the floor of the virtual environment. In response, a keyframe for the character is created at each of the four selected points 402, and the user is presented with a window 404.

In the window 404, the user can set the speed at which character should move along the path created by the keyframes. In this example, a walking speed is set as the default. That is, the character is animated to traverse the path at a constant speed.

Additionally, the orientation of the character can be set by the animation application so that the character is always facing in the direction that the character is moving. As such, an animator may be able to quickly lay out a keyframe path for character movement for what may be the most common form of movement—a character facing forward and moving at a constant rate of speed.

Figure 4B:
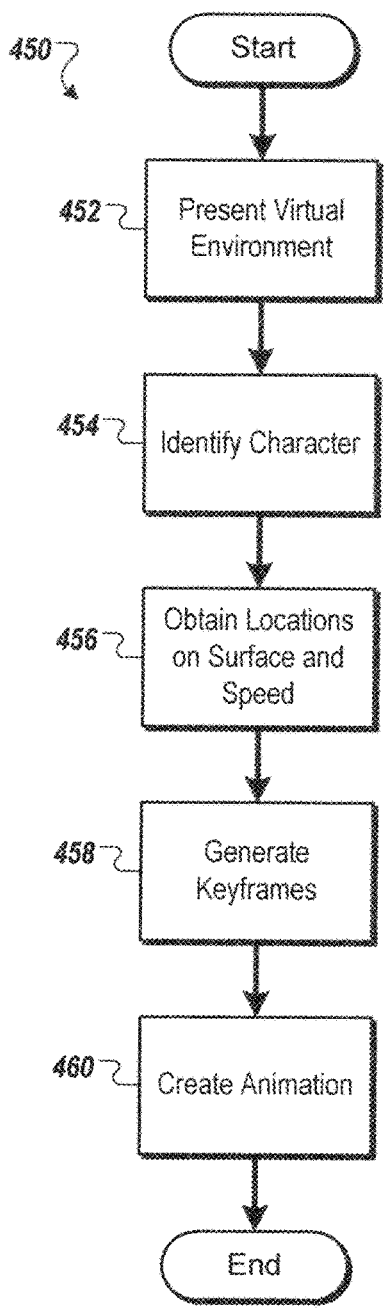
FIG. 4B is a flowchart of an example process for animating a character position.

FIG. 4B is a flowchart of an example process 450 for generating an animation path from a series of user selected locations. The process 450 can be performed by, for example, systems including one or more computing devices running an animation application. However, another system, or combination of systems, can be used to perform the process.

A virtual environment is presented (452). For example, an animation application can access a virtual environment from a datastore, e.g., in response to a user selection and populate the virtual environment with props, characters, lighting, cameras, and other assets. The virtual environment and the assets may be presented to a user (e.g., an animator) in a GUI that allows the animator to modify the assets and/or the virtual environment.

A character is identified (454). For example, the user may use an input device select a character in the virtual environment that the user wishes to animate. The character may have, for example, a 3D model rigged so that as the model's rig control values change, the shape of the model changes. Additionally, the character may have associated properties such as a name, walking speed, etc.

Location on surfaces and a speed are obtained (456). For example, a user, using an input device, may select a sequence of locations on one or more surfaces of the virtual environment. In response, the animation application can, for example, create markers for display on the surfaces in the selected locations. Additionally, the animation application can create line segments connecting each location in order of user selection.

Additionally, the user, using an input device, can specify the speed at which the character should move through the ordered sequence of locations. The character may have a collection of predefined speeds, e.g. walk, run, stroll for a human; slow, fast, reverse for a vehicle, from which the user may select, or the user may specify a speed numerically (e.g., 1.124 m/s). Alternatively, the user may select the time at which the character should arrive at some of the locations. For example, if the user specifies that the character should begin moving from the first location at time=3 seconds and arrive at the last location at time=11 seconds, the animation application can determine the speed needed to meet this criteria and apply the determined speed to the character. In some implementations, the user can specify different speeds for different portions of the traversal.

Keyframes are generated (458). For example, after all locations and the speed are obtained, and for each location in the ordered sequence of locations, the animation application can create one or more keyframes. Each keyframe can specify, for example, the location of the character at a particular time. Additionally, the animation application can determine the orientation of the character so that the character always appears, for example, to be walking forward. To do so, the animation application can, for example, create a smooth curve through each of the keyframes and use the direction of the curve as the orientation of the character at each keyframe.

An animation is created (460). Using the keyframes, the animation application can create an animation for the character in which the character traverses the keyframes at the determined orientations and speeds. In some implementations, the animation application can create an animation path through the keyframes, and the animation may follow this path. While moving, the character's rig many be manipulated so that the character, for example, goes through the motions of a walking or running.

FIG. 5 is an example GUI 500 showing an edit to a path curve and FIG. 6A is an example GUI 600 showing an offset animation path. The GUIs 500 and 600 show how different paths, associated with different characters, can be controlled.

In the GUI 500, one character in the virtual environment is associated with two paths 502 and 504. For example, the character may be animated to traverse the path 504, perform some keyframe animation in place (e.g. interact with a prop), and then travers the path 502. In such a case where a character has multiple paths, the interface of the animation application can permit the user to modify one path associated a character without affecting another path associated with that same character. In this example, the user wishes only to affect a single path, path 502. The user may select the path 502 and be presented with a control 506. The control 506 can include interactive elements that the user may manipulate, by way of an input device (e.g., mouse or tablet stylus) to deform, rotate, translate, or otherwise move the path 502. A manipulation made to the control 506 may result in a change the path 502 and not to the path 504. As such, a user (e.g., an animator) may adjust one path's animation without affecting another path's animation.

In the GUI 600, in contrast with the GUI 500, the animations of characters 602 and 604 are linked. This may be desirable, for example, if the script calls for the two characters to walk through the virtual environment while holding a conversation with each other. In the GUI 600, the character 604 has an animation path 606. This animation path 606 may be defined, for example, with keyframes or with curve shapes as previously described (FIG. 3). The character 602, however, may have a different kind of animation path 608.

The animation path 608 may be defined relative to, or offset from, the animation path 606. In this example, the animation path 608 is defined with a horizontal offset, meaning that the character 602 will remain horizontally aligned with the character 604. In additional to this horizontal offset, a vertical offset may also be used. With a vertical offset, the character 602 would lead ahead, or lag behind, the character 604.

A change to the animation path 606, for example by a user manipulating a path controller (FIG. 5) or by insertion of a keyframe or curve shape (FIG. 3A), can propagate to the offset path 608 so that the offset remains constant. That is, a user may change both animation paths 606 and 608 with only the commands needed to edit a single path. Depending on the configuration of the animations and desired edits, this may result in fast edits to complex groups of animations, reducing user time and effort.

Figure 1:
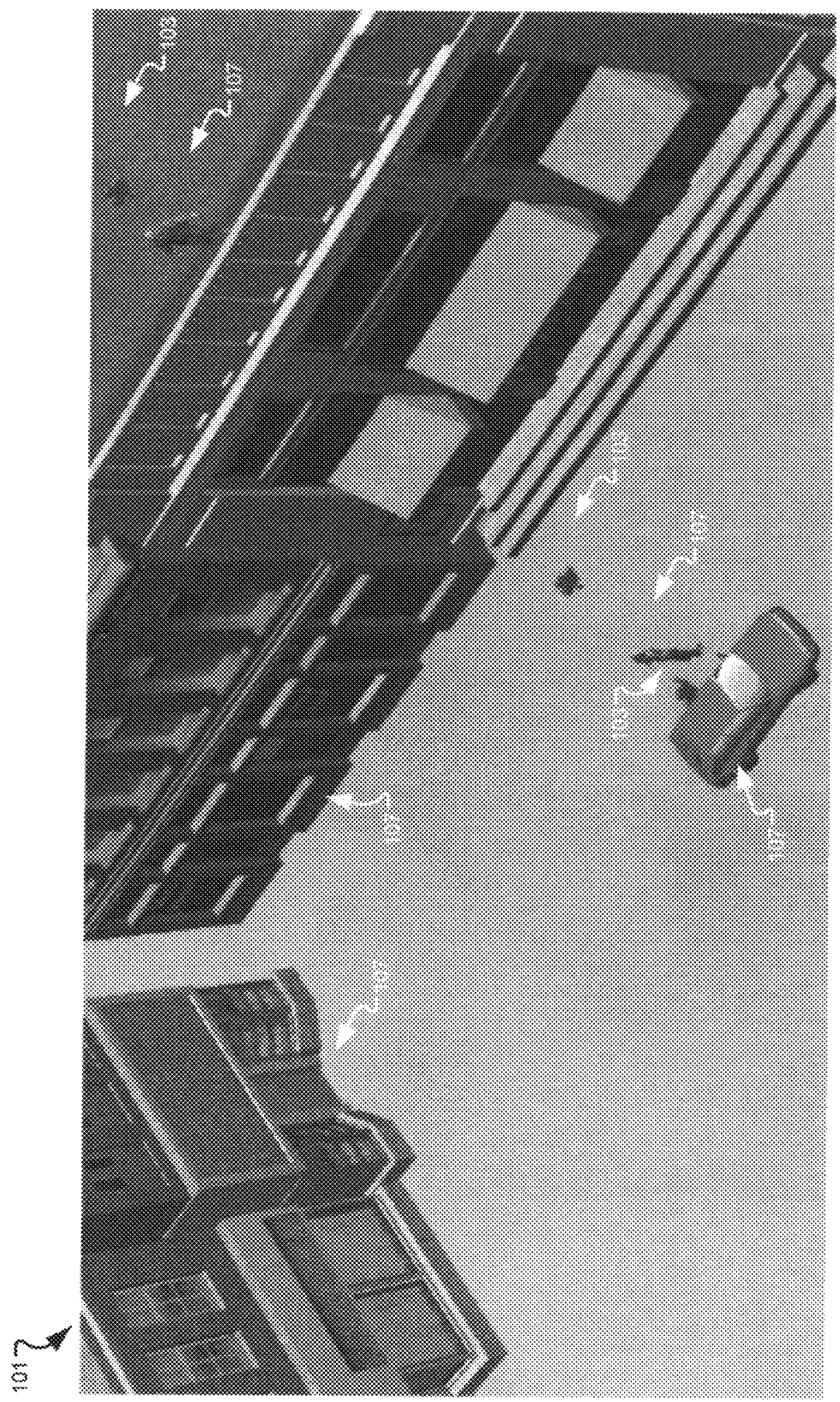
FIG. 1 is an image of an example 3D scene.

In some cases, the offset path 608 may only be linked to another path for a portion of the path 608. For example, if the script calls for the character 602 to walk with the character 604 for a time, but then to split off, the offset path 608 may be defined as an offset of the path 606, and then defined with keyframes and/or curve shapes, as previously described (e.g., FIG. 1). Another use for such a path involves a character moving onto and off of a vehicle. A character may follow an animation path defined by keyframes and curve shapes until the character boards a vehicle. For the duration of the vehicles movement, the character's animation path may be defined as an offset of the vehicle's animation path, essentially allowing the character to ride in the vehicle. When the character exits the vehicle, the animation path of the character may separate from the animation path of the vehicle, allowing the character to move freely away from the vehicle.

Figure 6B:
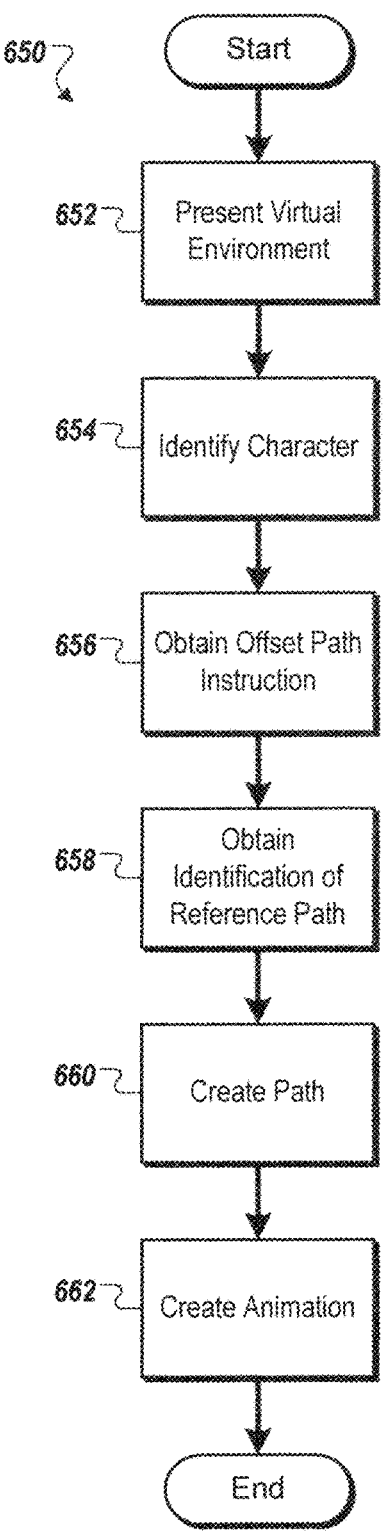
FIG. 6B is a flowchart of an example process for generating an offset animation path.

FIG. 6B is a flowchart of an example process 650 for generating an animation path that is offset from another animation path. The process 650 can be performed by, for example, systems including one or more computing devices running an animation application. However, another system, or combination of systems, can be used to perform the process.

A virtual environment is presented (652). For example, an animation application can access a virtual environment from a datastore, e.g., in response to a user selection, and populate the virtual environment with props, characters, lighting, cameras, and other assets. The virtual environment and the assets may be presented to a user (e.g., an animator) in a GUI that allows the animator to modify the assets and/or the virtual environment.

A character is identified (654). For example, the user may use an input device select a character in the virtual environment that the user wishes to animate. The character may have, for example, a 3D model rigged so that as the model's rig control values change, the shape of the model changes. Additionally, the character may have associated properties such as a name, walking speed, etc.

An offset path instruction is obtained (656). For example, the user may use an input device to select an offset path function through the GUI of the animation application. The identification of a reference path is obtained (658). For example, the user can, with an input device, select a reference path from which a new offset path is to be created. In one example, a character is walking down a long corridor and speaking a monologue. The user, wishing to have a camera lead the character, selects the character's path as the reference path from which an offset path for the camera is to be created. Optionally, the user may specify an offset value, or the animation application may determine an offset from, for example, the distance between two assets in the virtual environment.

A path is created (660). For example, the animation application can create a path for the camera that is offset from the path for the character. If at any point the path for the character is to change, for example a user editing the character's path, the animation application may, in some cases without user input, change the offset path so that it remains at the specified offset from the reference path An animation is created (662). For example, the animation application can create an animation for the character in which the character traverses the path at a predefined or user-defined speed. While moving, the character's rig (e.g., if the path is for a character instead of a camera) many be manipulated so that the character, for example, goes through the motions of a walking or running animation while traversing the path.

Figure 7:
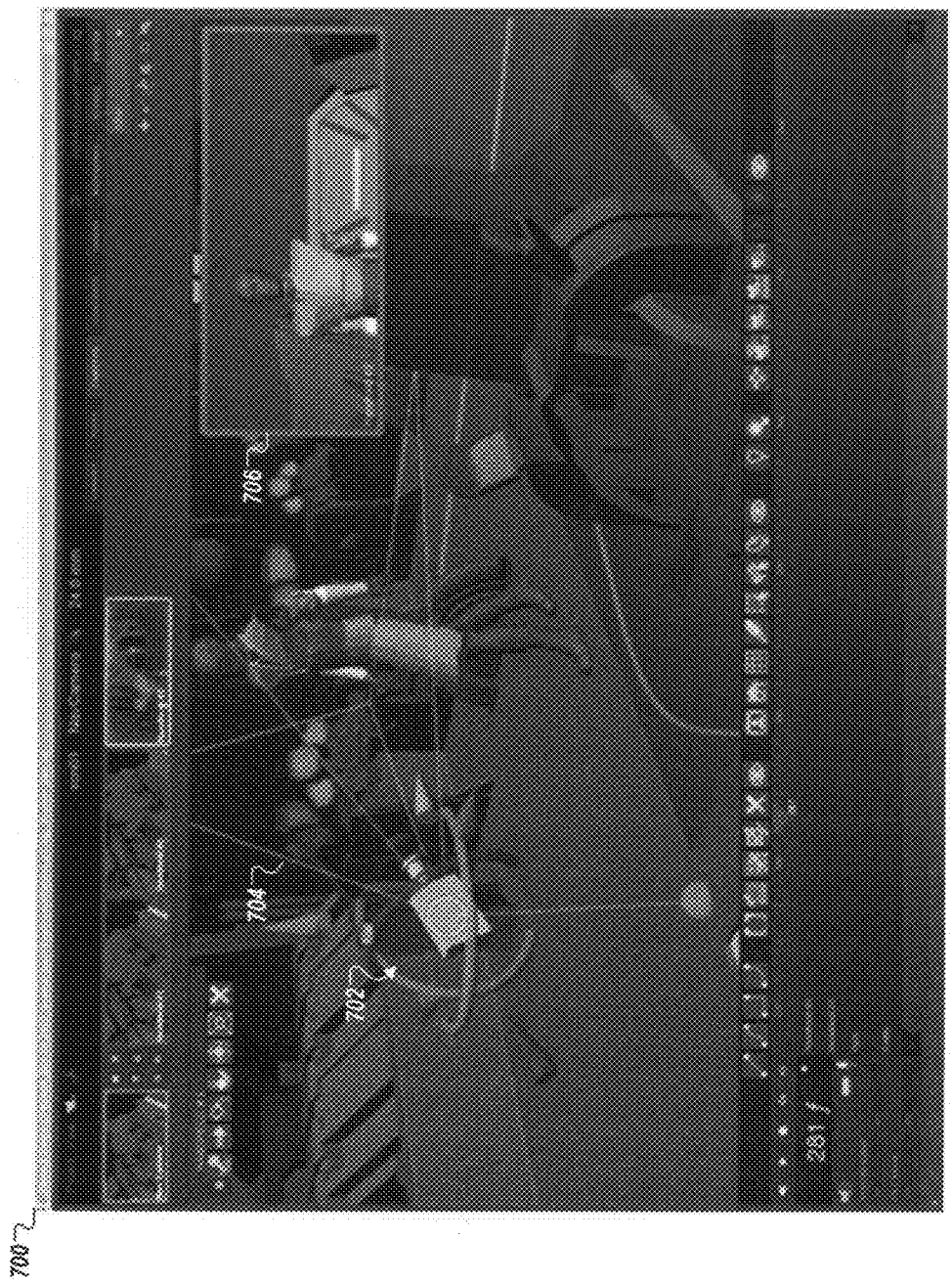
FIGS. 7 and 8 are example GUIs showing a virtual camera and associated viewfinder.
Figure 8:
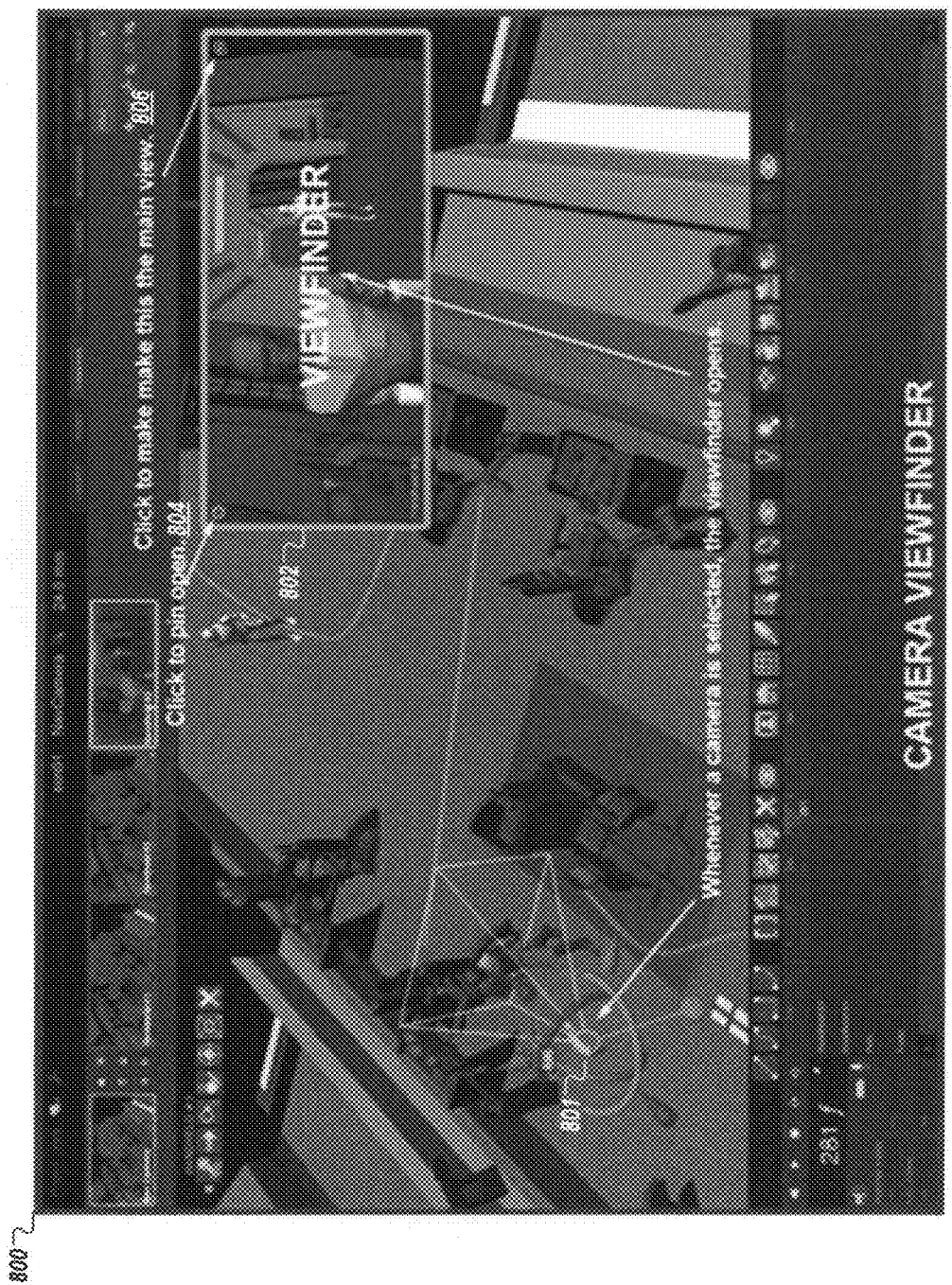

FIGS. 7 and 8 are example GUIs 700 and 800, respectively, showing a virtual camera and associated viewfinder. In the GUI 700 a user (e.g. an animator) has selected a virtual camera 702, for example by clicking on it with a mouse or tablet stylus. In response, the view of the animation application can change to the view show in the GUI 700. In this view, the user can see the virtual camera 702 and a wireframe of the virtual camera's 702 view frustum 704.

The view frustum 704 shows an outline of the portions of the virtual environment that are being captured by the virtual camera 702.

Additionally, the GUI 700 includes a viewfinder 706 that shows the virtual environment from the point of view of the virtual camera 702. By displaying to a user both the viewfinder 706 and the view frustum 704, the GUI 700 can facilitate a rapid understanding of which elements of the virtual environment are captured by the virtual camera 702 at the virtual camera's 702 current location and orientation.

Additionally, by moving the edit point of view behind the virtual camera 702 when selected, as opposed to at the virtual camera 702, the GUI 700 allows the user to manipulate parts of the virtual environment that are just outside of the view frustum. If, on the other hand, the GUI 700 moved the edit view to the lens of the camera, the user would first have to move the edit view to a different location before they would be able to manipulate parts of the virtual scene that are outside of the view frustum. As such, the view provided by the GUI 700 when the user selects the virtual camera 702 can provide, simultaneously, for both a rapid understanding of the scene from the virtual camera's 702 point of view as well as easy access to the parts of the virtual environment not captured by the virtual camera 702.

In the GUI 800, a viewfinder 802 is shown with two user operable controls 804 and 806. In this example, the controls 804 and 806 are toggle switches that the user can toggle between "on" and "off" states, but it will be understood that any appropriate kind of control is possible.

The viewfinder 802 may be presented to the user, for example, only as long as the user has selected the virtual camera 801. When the user selects a different element of the virtual environment, the viewfinder 802 may be normally configured to close. However, when the control 804 is toggled to the "on" state, the viewfinder may be configured to remain pinned open. That is, the user may freely select other elements of the virtual environment (e.g., to reposition a prop out of the view frustum) while maintaining the viewfinder 802. While pinned, the user may be able to, for example, resize and move the viewfinder 802.

The control 806 may, when toggled to the "on" state, change the main animation view to the view shown in the viewfinder 802. When the control 808 is toggled back to the "off" state, the main edit view may be changed back to the previous view (shown in GUI 800). This control 806 may be useful, for example for an editor that wishes to see how an edit would affect the rendering recorded by the virtual camera 801. This user could, for example, toggle on the control 806 to watch the animation from the virtual camera 801 point of view and discover that a prop is placed in an inconvenient spot. The user may toggle the control 806 "off", move the prop out of the scene, and toggle the control 806 "on" to see how the change looks from the virtual camera's 801 point of view.

Figure 9:
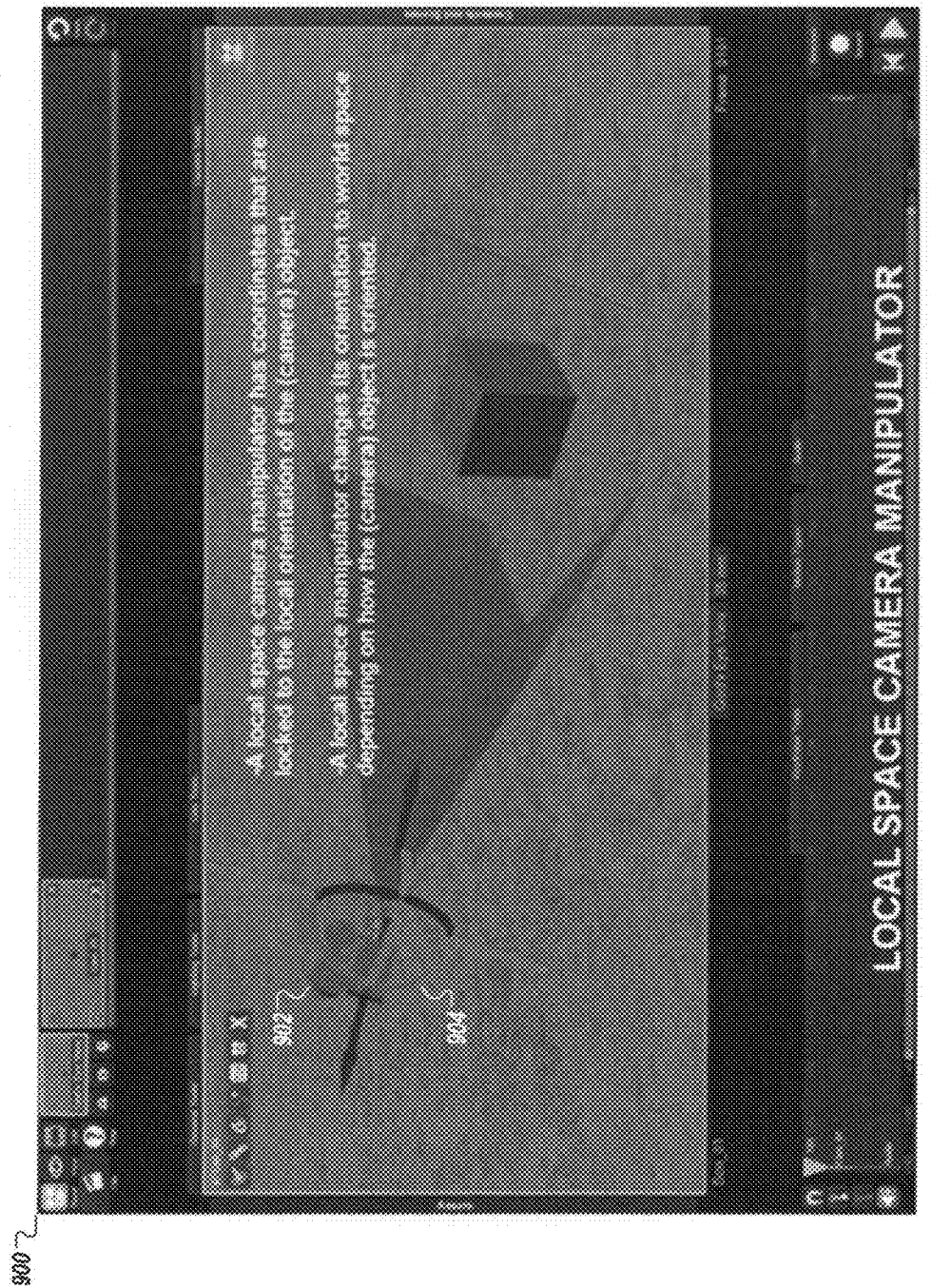
FIG. 9 is an example GUI showing a camera with a manipulator defined in local space.

FIG. 9 is an example GUI 900 showing a virtual camera 902 with a manipulator 904 defined in local space. That is, manipulations made to the camera 902 by the manipulator 904 are made relative to the virtual camera 902. For example, a crane-up or crane-down command given to the manipulator 904 can result in a translation of the camera in the up or down direction of the camera. If the virtual camera 902 is offset from the global origin of the virtual environment, as it is in the GUI 900, this crane-up or crane-down movement will be similarly offset from the global origin. Similarly, a tilt up or tilt down command to the manipulator 904 causes the virtual camera 902 to rotate around an origin of the virtual camera 902 (e.g. at the base of the camera or at the lens of the camera), not around the global origin. Another command possible with the manipulator 904 is a push in command. The push in command moves the virtual camera 902 forward along the virtual camera's 902 point of view, regardless of the offset between the virtual camera's 902 point of view and the global origin.

Figure 10:
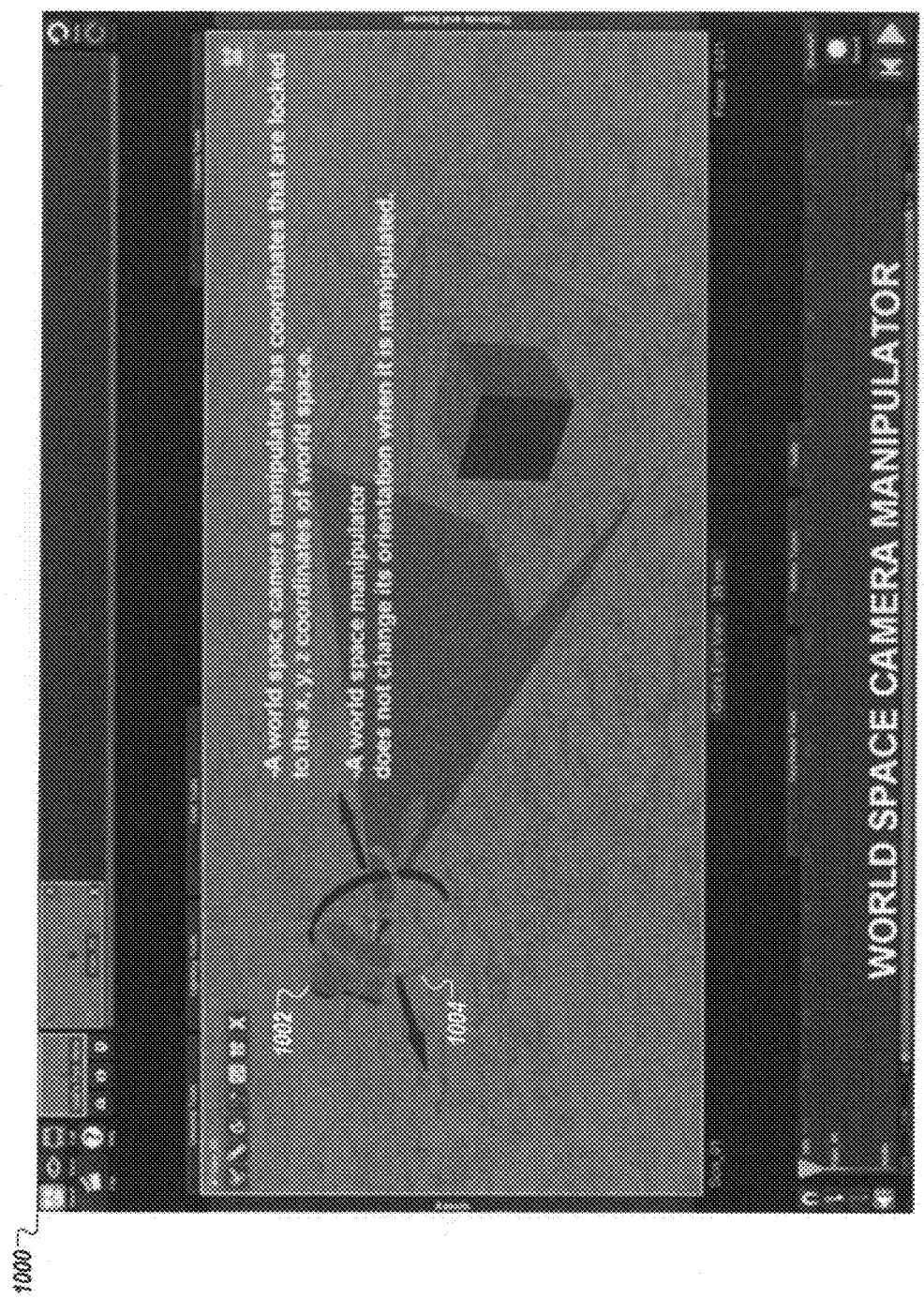
FIG. 10 is an example GUI showing a camera with a manipulator defined in global space.

FIG. 10 is an example GUI 1000 showing a virtual camera 1002 with a manipulator 1004 defined in global space. That is, manipulations made to the virtual camera 1002 by the manipulator 1004 are made relative to some global origin point. For example, a crane-up or crane-down command given to the manipulator 1004 can result in a translation of the virtual camera 1002 in the up or down direction of the virtual environment (e.g. up and away from the ground or down and lower to the ground).

The manipulator 1004 may be configured change the virtual camera's 1002 orientation by default. For example, in many uses, the origin of the virtual environment may not have any useful relationship with the animation occurring within the virtual environment. Consequently, there would be no need, e.g., for a rotation about the origin of the virtual environment. However, in some cases, the manipulator 1004 may be configured to change the orientation of the virtual camera 1002. For example, a space ship may have an origin at the tip of the ship. To create an establishment shot of the ship, a user may use the manipulator 1004 to rotate the virtual camera 1002 about the origin at the tip of the ship.

Figure 11:
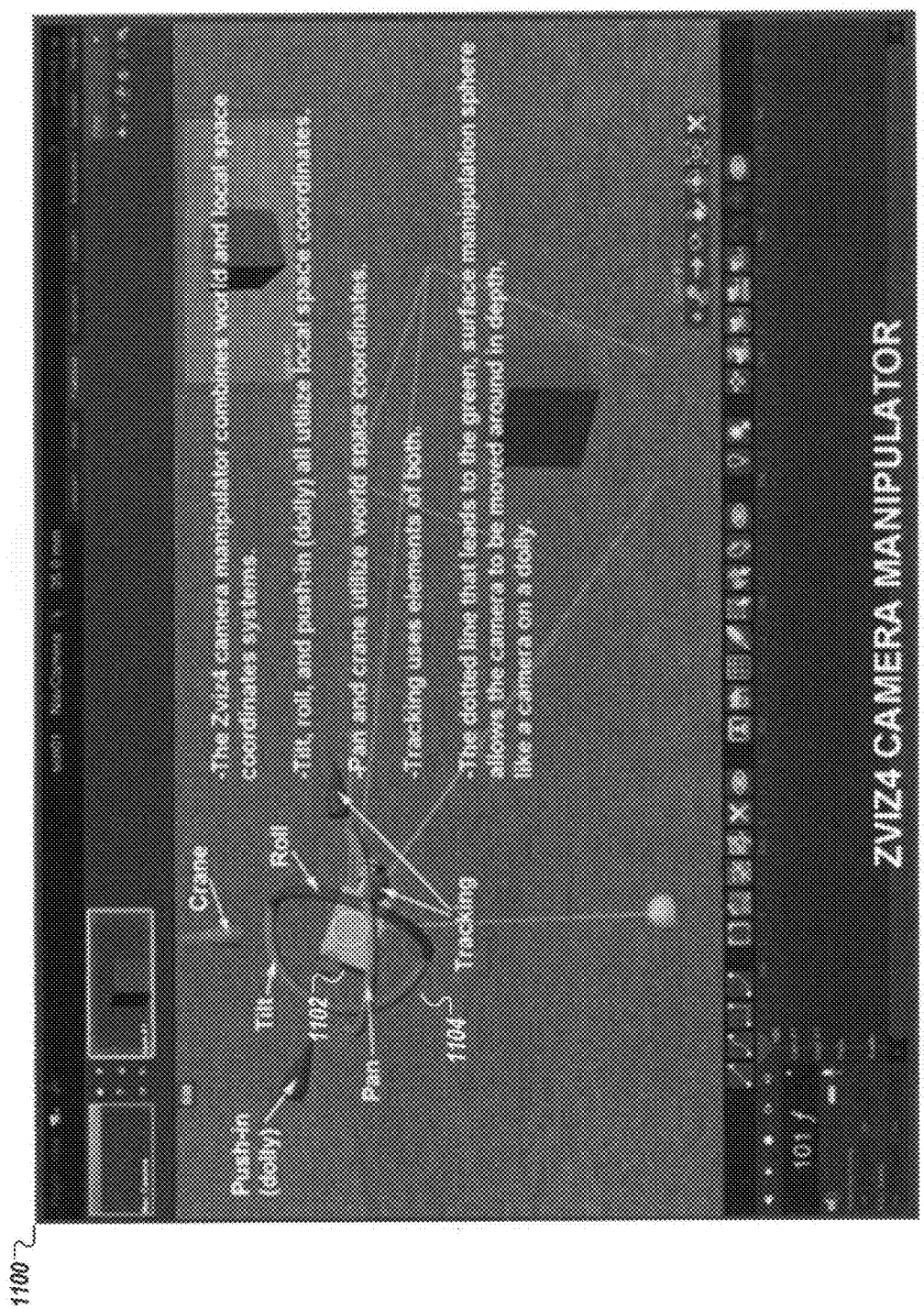
FIG. 11 is an example GUI showing a camera with a manipulator defined in global and local space.

FIG. 11 is an example GUI 1100 showing a virtual camera 1102 with a manipulator 1104 defined in global and local space. That is, some manipulations made to the virtual camera 1102 with a manipulator 1104 are made relative to an origin of the virtual camera 1102, and some manipulations made to the virtual camera 1102 with the manipulator 1104 are made relative to an origin of the virtual environment.

For the manipulator 1104, tilt, roll, and push-in commands are made to the manipulator 1104 in reference to the origin of the camera and thus tilt, roll, and push-in the camera relative to the origin of the virtual camera 1102. Conversely, pan and crane command are made to the manipulator 1104 relative to the origin of the virtual environment. A depth control sphere may of the manipulator 1104 can be used by a user to move the virtual camera 1102 in depth, similar to how a physical dolly moves a physical camera.

In addition to some commands being purely global and some commands being purely local, some additional commands may be made in a hybrid using elements of both local and global frames. For example, a track command to the manipulator 1104 may be used to track a particular object in the virtual environment as it moves. The manipulator 1104 may use, for example, global oriented pan and crane as well as local oriented tilt and roll to track the object.

Figure 12B:
FIG. 12B shows an example GUI showing 3D animation view overlain by a 2D edit view with constant updates

FIG. 12A schematically shows an example GUI 1204 showing 3D animation view 1200 overlain by a 2D edit view 1202 with constant updates. As described previously (e.g., in FIG. 2) an animator generally uses a 3D animation view 1200 of a virtual environment, which may be from any arbitrary point of view, to manipulate the assets in the environment, e.g., applying animations, etc. Once satisfied with the animation, one or more 2D renderings of the environment are generated from the points of view of the cameras in the environment. These 2D renderings can be used by an editor in a 2D view 1202 to edit together a scene.

In the course of this type of work, the editor may wish for a change in one of the 2D renderings. To create this modified 2D rendering, it would be necessary to modify the 3D animation used to create the rendering. The animation application may present to the animator or to the editor, who may be the same user in some cases, a 3D animation view overlain by a 2D edit view with constant updates 1204. For a nonschematic view of the view 1204, see FIG. 12B.

In the view 1204, the animation application may receive input associated with the 3D animation mode. This input may include, for example, commands to change an animation path, add or remove lighting, move an asset in the virtual environment, etc. In response, the animation application may update both the 3D animation view and the 2D edit view in the view 1204. That is, the user may be presented with contemporaneous feedback about how the 2D edit view will change in response to a change to the 3D animation environment. This feedback may be in real-time. That is, subject to system performance, the changes made to the view 1204 may be immediate after the input is obtained.

Providing these two views overlain together, as is done in the view 1204, provides a number of differences than, for example, displaying the 3D animation view side-by-side with the 2D edit view. For example, in many cases, an animator or editor may configure their workstation such that their monitors are in a standard widescreen format that fills most of their view. Displaying these two views side by side would require either reducing the size, and thus detail level, of both views, or require additional hardware that is not often used. In another difference, a user presented with both views side-by-side would have to decide to either turn their head back and forth as revisions and reviews are made, or make the revisions blind while watching only the 2D edit view. Instead, providing the view 1204 gives the user a single point of focus, at a constant distance, from which all needed information can be visually observed. In some instances, the view 1204 is, or is similar to, a heads-up display.

Providing these two views overlain together can be used to facilitate other use cases. For example, another video or image may be overlain over the 3D animation view 1200 overlain by a 2D edit view 1202. This additional video may be a target that an animator is attempting to create or recreate with the animation of the scene.

For example, the additional video may be a recorded storyboard (e.g. an animatic or photomatic), a rendered video of a model or scene that has been lost, or a video of a live action actor or prop. The animator may be tasked with animating the scene to either replicate the additional video, or to animate the rest of the scene to appropriately interact with a subject in the target video. In some cases, the target video may be a previously recorded 2D edit view 1202 that has been modified. For example, an editor may take the recorded 2D edit view 1202 and decide that it should be sped up, slowed down, or cropped, etc.

To replicate the video, the animator can arrange and animate the models in the 3D animation view 1200, using the 2D edit view 1202 as feedback, trying to match the 2D edit view 1202 to the target video as closely as possible. If, for example, the target video is an animatic shows a car driving from left to right in the video for 300 frames, the animator can arrange a virtual camera and moving car so that the car travels from left to right past the camera, and adjust the speed of the car so that it travels across the view of the camera in 300 frames.

To interact with the subject of a video, the animator can arrange and animate the models in the 3D animation view 1200, using the 2D edit view 1202 as feedback, trying to make the models and the subject of the video look as they are interacting with each other. If, for example, the target video is a live actor dancing, the animator can place and animate a character model to dance in a scene, adjusting the animation of the model until the overlay of the human actor and animated model appear to be realistically interacting with each other.

FIG. 13 is a schematic diagram that shows an example of a computing system 1300. The computing system 1300 can be used for some or all of the operations described previously, according to some implementations. The computing system 1300 is intended to represent various forms of digital computers, such as laptops, desktops, workstations, personal digital assistants, servers, blade servers, mainframes, personal digital assistants, cellular telephones, smart-phones, tablet computers and other similar computing devices.

The computing system 1300 includes a processor 1310, a memory 1320, a storage device 1330, and an input/output device 1340. Each of the processor 1310, the memory 1320, the storage device 1330, and the input/output device 1340 are interconnected using a system bus 1350. The processor 1310 is capable of processing instructions for execution within the computing system 1300. In some implementations, the processor 1310 is a single-threaded processor. In some implementations, the processor 1310 is a multi-threaded processor. The processor 1310 is capable of processing instructions stored in the memory 1320 or on the storage device 1330 to display graphical information for a user interface on the input/output device 1340.

The memory 1320 stores information within the computing system 1300. In some implementations, the memory 1320 is a computer-readable medium. In some implementations, the memory 1320 is a volatile memory unit. In some implementations, the memory 1320 is a non-volatile memory unit.

The storage device 1330 is capable of providing mass storage for the computing system 1300. In some implementations, the storage device 1330 is a computer-readable medium. In various different implementations, the storage device 1330 may be a floppy disk device, a hard disk device, an optical disk device, or a tape device.

The input/output device 1340 provides input/output operations for the computing system 1300. In some implementations, the input/output device 1340 includes a keyboard and/or pointing device. In some implementations, the input/output device 1340 includes a display unit for displaying graphical user interfaces. In some implementations, the input/output device 1340 includes a digitizer, touch sensor, and/or three dimensional motion sensing device.

Some features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM (compact disc read-only memory) and DVD-ROM (digital versatile disc read-only memory) disks. The processor and the memory can be supplemented by, or incorporated in, ASICs (application-specific integrated circuits).

To provide for interaction with a user, some features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Some features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

What is claimed is:

1. A computer system comprising:
   one or more processing devices;
   a computer-readable media having instructions that, when executed by the one or more processing devices, generates an animation application capable of processing an animation environment, wherein the animation environment comprises a virtual camera;
   an input device for receiving input from a user to the animation application;
   an output device for displaying output to the user of the animation application;
   wherein the animation application generates a graphical user interface (GUI) on the output device; and
   wherein the animation application is configured to have a first mode of operation that includes:
      displaying, in the GUI on the output display device, a 3D animation view of the animation environment, wherein the 3D animation view comprises:
         the virtual camera displayed within the animation environment; and
         a wireframe of a view frustum of the virtual camera displayed within the animation environment, wherein the wireframe of the view frustum shows an outline in the 3D animation view of portions of the 3D animation view that are captured by the virtual camera; and
      generating a 2D edit view that overlays the 3D animation view and that displays the animation environment from a viewpoint of the virtual camera.

2. The computer system of claim 1, wherein the first mode of operation further includes receiving input through the input device, which results in i) a change to the animation environment, ii) an update to the 3D animation view of the animation environment that reflects the change to the animation environment, and iii) an update to the 2D edit view of the animation environment that reflects the change to the animation environment.

3. The computer system of claim 2, wherein the update to the 3D animation view and the update to the 2D edit view of the animation environment are in real time.

4. The computer system of claim 2, wherein the animation environment comprises a plurality of assets within the animation environment, and wherein the change in the animation environment is a modification of at least one asset.

5. The computer system of claim 1, wherein the animation application is further configured to have a second mode of operation that includes displaying, through the output device, the 3D animation view of the animation environment; and
   wherein the second mode of operation further includes receiving second input through the input device, which results in i) a change to the animation environment and ii) an update to the 3D animation view of the animation environment that reflects the change to the animation environment.

6. The computer system of claim 5, wherein the animation application is further configured to have a third mode of operation that includes displaying, through the output device, the 2D edit view of the animation environment; and
   wherein the third mode of operation further includes receiving third input through the input device, which results in a change to the 2D view of the animation environment.

7. The computer system of claim 6, wherein the animation application is configured to run in the first mode, the second mode, and the third mode on a single workstation.

8. The computer system of claim 1, wherein the animation application is further configured to have a fourth mode of operation that includes displaying, through the output device, the 3D animation view of the animation environment overlain by a 2D edit view of the animation environment overlain by a target video.

9. A method comprising:
   running on a computing system an animation application capable of processing an animation environment, wherein the computer system comprises:
      an input device for receiving input from a user to the animation application; and an output device for displaying output to the user of the animation application;

and wherein the animation environment comprises a virtual camera;

generating by the animation application a graphical user interface (GUI) on the output device;

displaying, in the GUI on the output display device, by the animation application operating in a first mode, a 3D animation view of the animation environment, wherein the 3D animation view comprises:

the virtual camera displayed within the animation environment; and a wireframe of a view frustum of the virtual camera displayed within the animation environment, wherein the wireframe of the view frustum shows an outline in the 3D animation view of portions of the 3D animation view that are captured by the virtual camera;

generating a 2D edit view of the animation environment from the viewpoint of the virtual camera that overlays the 3D animation view; and receiving input, through the input device to the animation application operating in the first mode, from the user of the animation application.

10. The method of claim 9 further comprising:

changing, responsive to receiving the input, the animation environment;

updating, responsive to receiving the input, the 3D animation view of the animation environment that reflects the change to the animation environment; and updating, responsive to receiving the input, the 2D edit view of the animation environment to reflect the change to the animation environment.

11. The method of claim 10, wherein updating the 3D animation view and updating the 2D edit view is performed in real time.

12. The method of claim 10, wherein the animation environment comprises:

a plurality of assets within the animation environment, and wherein the change in the animation environment is a modification of at least one asset.

13. The method of claim 9 further comprising:

displaying, through the output device by the animation application operating in a second mode, the 3D animation view of the animation environment;

receiving second input, through the input device to the animation application operating in the second mode, from the user of the animation application;

changing, responsive to receiving the second input, the animation environment; and updating, responsive to receiving the second input, the 3D animation view of the 3D animation view of the animation environment to reflect the change to the animation environment.

14. The method of claim 13 further comprising:

displaying, through the output device by the animation application operating in a third mode, the 2D edit view of the animation environment;

receiving third input, through the input device to the animation application operating in the third mode, from the user of the animation application; and changing, responsive to receiving the third input, the 2D view of the animation environment.

15. The method of claim 14, wherein the animation application is configured to run in the first mode, the second mode, and the third mode on a single workstation.

16. A non-transitory computer-readable medium having stored therein instructions that when executed perform a method comprising:

running on a computing system an animation application capable of processing an animation environment, wherein the computer system comprises:

an input device for receiving input from a user to the animation application; and an output device for displaying output to the user of the animation application; and wherein the animation environment comprises a virtual camera;

generating by the animation application a graphical user interface (GUI) on the output device;

displaying, in the GUI on the output display device, by the animation application operating in a first mode, a 3D animation view of the animation environment, wherein the 3D animation view comprises:

the virtual camera displayed within the animation environment; and a wireframe of a view frustum of the virtual camera displayed within the animation environment, wherein the wireframe of the view frustum shows an outline in the 3D animation view of portions of the 3D animation view that are captured by the virtual camera;

generating a 2D edit view of the animation environment from the viewpoint of the virtual camera that overlays the 3D animation view; and receiving input, through the input device to the animation application operating in the first mode, from the user of the animation application.

17. The non-transitory computer-readable medium of claim 16, the method further comprising:

changing, responsive to receiving the input, the animation environment;

updating, responsive to receiving the input, the 3D animation view of the animation environment that reflects the change to the animation environment; and updating, responsive to receiving the input, the 2D edit view of the animation environment to reflect the change to the animation environment.

18. The non-transitory computer-readable medium of claim 17, wherein updating the 3D animation view and updating the 2D edit view is performed in real time.

19. The non-transitory computer-readable medium of claim 16, the method further comprising:

displaying, through the output device by the animation application operating in a second mode, the 3D animation view of the animation environment;

receiving second input, through an input device to the animation application operating in the second mode, from the user of the animation application;

changing, responsive to receiving the second input, the animation environment; and updating, responsive to receiving the second input, the 3D animation view of the 3D animation view of the animation environment to reflect the change to the animation environment.

20. The non-transitory computer-readable medium of claim 19, the method further comprising:

displaying, through the output device by the animation application operating in a third mode, the 2D edit view of the animation environment;

receiving third input, through the input device to the animation application operating in the third mode, from the user of an animation application; and changing, responsive to receiving the third input, the 2D view of the animation environment, wherein the animation application is configured to run in the first mode, the second mode, and the third mode on a single workstation.

\* \* \* \* \*